July 21, 1931.  C. H. DODGE  1,815,244
TRUCK
Filed March 15, 1929
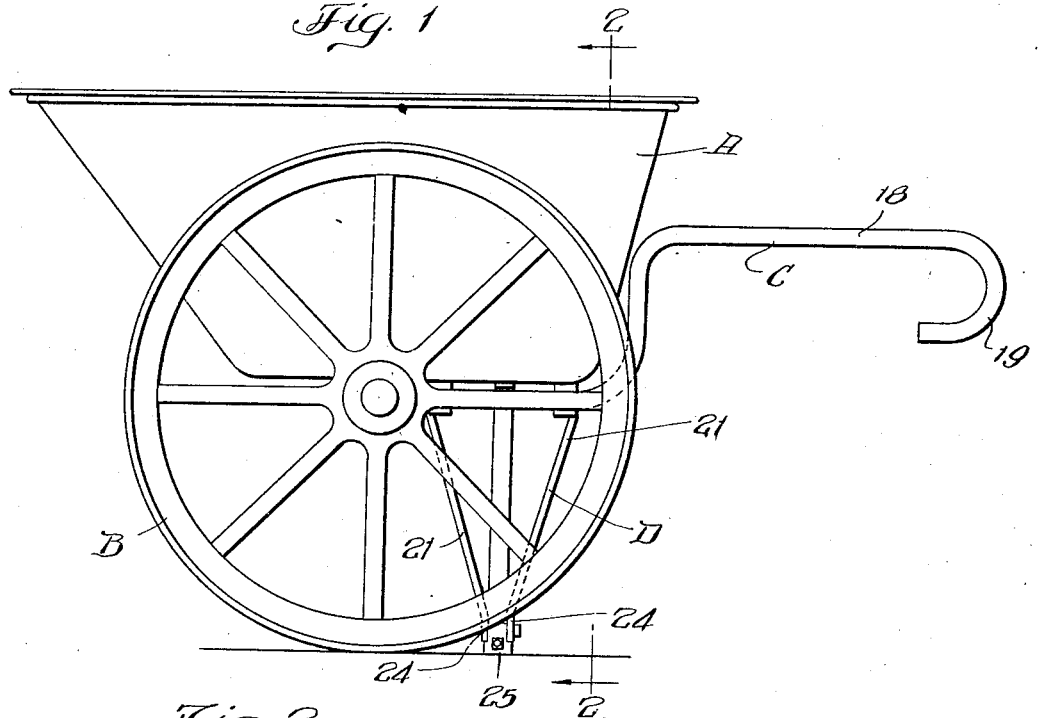
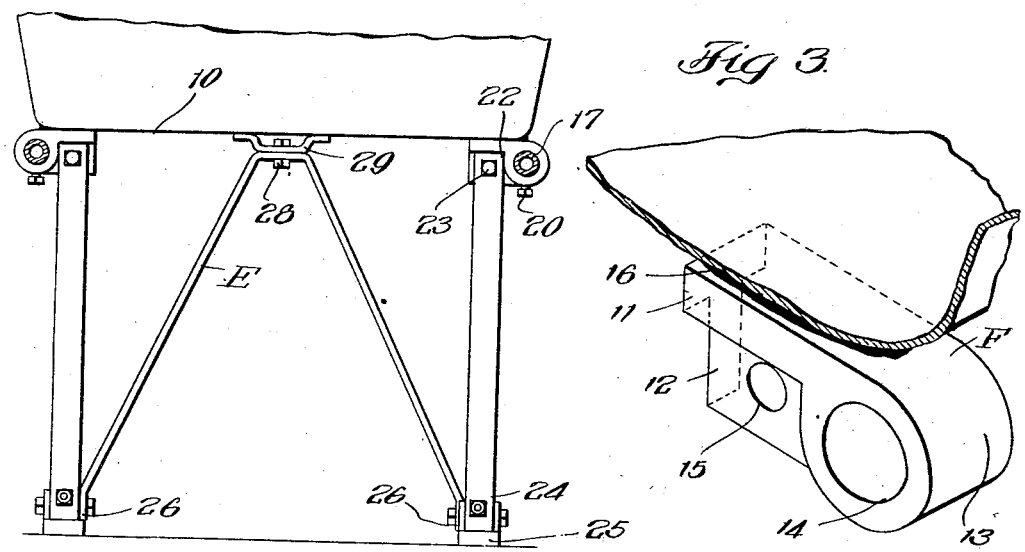
Witness
William P. Kilroy
Inventor
Charles H. Dodge
By Joseph Harris
His atty Patented July 21, 1931

1,815,244

UNITED STATES PATENT OFFICE

CHARLES H. DODGE, OF CHICAGO, ILLINOIS, ASSIGNOR TO THE GLOBE COMPANY, OF CHICAGO, ILLINOIS, A CORPORATION OF ILLINOIS

TRUCK

Application filed March 15, 1929. Serial No. 347,337.

This invention relates to improvements in trucks, and more particularly, those trucks used for general purposes such as in packing plants for loading of meats or conveying meats to vats.

One object of the invention is to provide a truck of the type above indicated which is strong, durable, economical to manufacture and which complies with all sanitary regulations.

Another object of the invention is to provide a truck of the two-wheel type, having handles, the arrangement being such that the sheet metal body is entirely free from projections or knobs, such as rivets, bolts or the like, on the interior, to the end that there may be no places difficult of access for cleaning.

More specifically, an object of the invention is to provide novel combined attaching means for the handles and supporting legs of the truck so constructed that the handles and the legs may be readily removed or interchanged, the attaching means being fixed to the body in such manner as to avoid the use of any bolts, rivets or the like passing through the sheet metal of the body so as to leave the body wholly free from obstructions.

In the drawings forming a part of this specification, Figure 1 is a side elevational view of a truck having my improvements incorporated therein. Figure 2 is a vertical sectional view corresponding to the line 2—2 of Figure 1. And Figure 3 is a broken detail perspective illustrating more particularly one of the improved attaching brackets.

The truck, as shown, comprises, broadly, a sheet metal body or container portion A; a pair of wheels B—B (only one of which is illustrated in the drawing); a pair of handles C—C; two sets of supporting legs D—D; and a brace E for the two sets of legs.

The body A is preferably made of sheet metal, free from seams, so as to leave an entirely smooth surface on the interior.

The wheels B are mounted on a suitable axle, the supports for which are secured to the bottom 10 of the body and preferably the axle arrangement is in accordance with the disclosure of my prior Patent No. 1,561,313, granted November 10, 1925, for truck underframe construction.

To provide means for attaching the handles and legs, I preferably employ four novel brackets, one of which is indicated in detail in Figure 3 and referenced broadly F. There will be four of said brackets F, two on each side of the body A, located at the bottom thereof, and in alinement with each other. Each of said brackets F is preferably in the form of a casting having a top heavy flange 11, a centrally disposed depending vertical flange 12, and an outer sleeve or bushing section 13 having a central circular aperture 14. The flange 12 will also be perforated, as indicated at 15, for the purpose hereinafter described.

Each of the brackets F is arranged transverse to the length of the body A and is secured to the underside of the bottom wall 10 of the body, by welding, as indicated conventionally at 16 in Figure 3. When applied as above described, it is evident that the apertures 14 of each pair of brackets on each side of the body will be in alinement, thereby adapting said apertures to removably receive the inner ends 17 of the two handles C, each of which is preferably in the form of a tube or pipe, bent as best illustrated in Figure 1 where it will be seen that the outer portions 18 thereof are upwardly offset and terminate in curved handles 19, so as to bring the handles at the proper height for the user. The pipe handles are secured to the brackets by suitable means, such as the set screws 20, one for each bracket F.

Each leg structure D, on each side of the truck, preferably comprises two straps 21—21, each of which has a short vertical section 22 at its upper end, lying against one of the depending flanges 12 of the brackets F and secured thereto by suitable bolts 23. From the brackets F, the leg straps 21 are downwardly converged and terminate in short vertical sections 24—24, which are bolted to the opposite sides of a notched or recessed, preferably cast iron, shoe 25, as shown in Figures 1 and 2. With this construction, it is evident that the brackets F serve for the attachment of both the handles C and the leg structures and permit of replacing or renewing both the handles and the leg structure without involving any disturbance of the brackets F, and leaving the interior of the body A entirely free from any obstructions, such as rivet heads or bolt heads, as has heretofore been the general practice, thus leaving the interior of the body A entirely smooth and permitting the same to be completely cleaned without danger of any foreign matter accumulating on any projections.

The two leg structures D are preferably braced laterally by the bracing strip E, which is of generally inverted V-formation, terminating in short vertical sections 26—26, bolted transversely to the shoes 25, as best shown in Figure 2. At its upper end, the brace E has a horizontal section 27 which is preferably bolted as indicated at 28, to the underside of a bent or pressed bracket 29, which in turn is welded to the underside of the body so as to avoid the use of any rivets or the like passing through the sheet metal of the body portion. It will be observed that the brace E may be replaced or renewed without disturbing the bracket 29 and the shoes 25 may be replaced as the latter become worn.

With the construction shown and described, it is evident that the truck may be economically manufactured; repairs or replacements may be made with a minimum of expense and labor and the interior of the body is left entirely free from obstructions, so as to render the same completely sanitary and thereby particularly adapting the truck for the handling of meats.

I have herein shown and described what I now consider the preferred manner of carrying out my invention, but the same is merely illustrative and I contemplate all changes and modifications that come within the scope of the claims appended hereto.

I claim:

1. In a wheel supported truck having a sheet metal body, the latter having a flat bottom, the combination with four brackets welded to the underside of the body bottom, said brackets being arranged in pairs along each side edge of the bottom, each of said pairs of brackets having alined apertures, and each bracket having also a vertical transversely extending flange, said flanges being provided with apertures arranged parallel to the respective first named apertures; of a pair of handles, each handle having its inner portion received within the first mentioned alined apertures of a pair of brackets; a supporting leg on each side of the truck, each said leg including upwardly diverging straps, the upper ends of said straps being secured to the said bracket flanges by means extending through said apertures of the flanges, and a shoe at the bottom of each supporting leg, each shoe having the lower ends of the straps detachably fastened thereto; and a transverse brace having downwardly diverging strap arms, the lower ends thereof being detachably secured to said shoes.

2. In a wheel supported truck having a sheet metal body, the latter having a flat bottom, the combination with four brackets welded to the underside of the body bottom, said brackets being arranged in pairs along each side of the bottom, each said pair of brackets having alined apertures and each bracket having also a vertically disposed depending apertured flange; of handle means for the truck, said means including two side members, each side member having its inner portion straight and the straight portions adapted to be inserted through and removed from said alined apertures of the brackets; and supporting legs including upwardly diverging straps, the upper ends of said straps being detachably secured to said depending flanges by means extended through the apertures of said flanges, whereby said legs and handle means are independently detachable from the brackets while the brackets remain welded to the body bottom.

In witness that I claim the foregoing I have hereunto subscribed my name this 1st day of March, 1929.

CHARLES H. DODGE.